(12) United States Patent
Murakami et al.

(10) Patent No.: US 9,648,679 B2
(45) Date of Patent: May 9, 2017

(54) VEHICLE LAMP AND LIGHTING CIRCUIT THEREOF

(71) Applicant: KOITO MANUFACTURING CO., LTD., Tokyo (JP)

(72) Inventors: Kentarou Murakami, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/874,005

(22) Filed: Oct. 2, 2015

(65) Prior Publication Data
US 2016/0096467 A1 Apr. 7, 2016

(30) Foreign Application Priority Data
Oct. 2, 2014 (JP) ................................. 2014-204000

(51) Int. Cl.
*B60Q 1/14* (2006.01)
*H05B 33/08* (2006.01)
*F21S 8/10* (2006.01)

(52) U.S. Cl.
CPC ...... *H05B 33/0815* (2013.01); *F21S 48/1159* (2013.01); *F21S 48/137* (2013.01);
(Continued)

(58) Field of Classification Search
None
See application file for complete search history.

(56) References Cited

U.S. PATENT DOCUMENTS

| 6,225,992 B1 * | 5/2001 | Hsu | G09G 3/3696 |
| | | | 327/544 |
| 8,106,634 B2 * | 1/2012 | Hojo | H02M 3/156 |
| | | | 323/222 |

(Continued)

FOREIGN PATENT DOCUMENTS

| EP | 2579684 A1 | 4/2013 |
| EP | 2628366 A2 | 8/2013 |

(Continued)

OTHER PUBLICATIONS

Preliminary Search Report and Written Opinion issued in corresponding French Application No. 1559407, mailed on Dec. 16, 2016 (8 pages).

*Primary Examiner* — Crystal L Hammond
(74) *Attorney, Agent, or Firm* — Osha Liang LLP

(57) ABSTRACT

A lighting circuit, which is mounted in a vehicle lamp, can change the luminance at high speeds. The lighting circuit is used together with a semiconductor light source and makes up a vehicle lamp. A switching converter supplies power to the semiconductor light source. A converter controller controls the switching converter. A current detection circuit detects a current $I_{DRV}$ which is supplied from the switching converter to the semiconductor light source. A hysteresis comparator compares the detected current value with an upper threshold voltage and a lower threshold voltage and generates a control pulse according to the results of the comparison. A threshold voltage generating circuit receives a variable control voltage which indicates a target amount of a current and generates the upper threshold voltage and the lower threshold voltage according to the control voltage.

15 Claims, 11 Drawing Sheets

(52) U.S. Cl.
CPC ........ *F21S 48/1757* (2013.01); *H05B 33/083* (2013.01); *B60Q 1/1423* (2013.01)

(56) References Cited

U.S. PATENT DOCUMENTS

| | | | | |
|---|---|---|---|---|
| 8,536,799 | B1* | 9/2013 | Grisamore | H05B 33/0815 315/185 R |
| 8,686,645 | B2* | 4/2014 | Koo | H05B 33/0815 315/122 |
| 9,277,612 | B2* | 3/2016 | Imanaka | H05B 33/0815 |
| 2008/0203946 | A1 | 8/2008 | Ito et al. | |
| 2010/0090604 | A1* | 4/2010 | Maruyama | H05B 33/0803 315/119 |
| 2010/0109537 | A1* | 5/2010 | Nishino | H05B 33/0827 315/185 R |
| 2012/0262082 | A1* | 10/2012 | Esaki | H05B 33/0848 315/224 |
| 2013/0088172 | A1* | 4/2013 | Kikuchi | H05B 33/089 315/307 |
| 2013/0278165 | A1* | 10/2013 | Kikuchi | H05B 33/0848 315/224 |
| 2014/0042325 | A1 | 2/2014 | Yamamura | |
| 2014/0145639 | A1* | 5/2014 | Laubenstein | B60Q 1/0094 315/287 |
| 2014/0265890 | A1* | 9/2014 | Ito | B60Q 1/00 315/186 |
| 2015/0069906 | A1* | 3/2015 | Niedermeier | H05B 33/0803 315/77 |

FOREIGN PATENT DOCUMENTS

| | | |
|---|---|---|
| EP | 2628366 B1 | 10/2014 |
| JP | 2008205357 A | 9/2008 |
| JP | 2012224317 A | 11/2012 |
| WO | 2013/113550 A1 | 8/2013 |

* cited by examiner

VEHICLE LAMP AND LIGHTING CIRCUIT THEREOF

CROSS-REFERENCE TO RELATED APPLICATION

The present application claims the benefit of priority of Japanese Patent Application No. 2014-204000, filed on Oct. 2, 2014, which is incorporated herein by reference.

TECHNICAL FIELD

The present invention relates to a vehicle lamp for use on a motor vehicle.

BACKGROUND ART

In general, a vehicle lamp can switch from a low beam to a high beam or vice versa. The low beam is a beam for illuminating a near field ahead of a vehicle with a predetermined illuminance, and the regulation exists relating to the luminous intensity distribution so as not to dazzle drivers of an on-coming vehicle and a preceding vehicle. The low beam is used mainly in driving in an urban area. On the other hand, the high beam is a beam for illuminating a far and wide field ahead of the vehicle with a relatively high illuminance, and the high beam is used mainly in driving at high speeds on a road where there are few on-coming and preceding vehicles. Consequently, the high beam is much superior to the low beam in visibility for the driver but causes a problem that the drivers of on-coming and preceding vehicles are dazzled.

In recent years, the ABD (Adaptive Driving Beam) technology has been proposed in which a beam pattern of a high beam is dynamically and suitably controlled based on an ambient condition of a vehicle. The ABD technology is a technology used to reduce a risk of dazzling drivers of preceding and on-coming vehicles or pedestrians existing ahead of the vehicle by detecting the existence of preceding and on-coming vehicles or pedestrians ahead of the vehicle and reducing the power of light beams which illuminate areas where the preceding and on-coming vehicles or pedestrians are detected.

A vehicle lamp having an ABD function will be described. FIG. 1 is a block diagram of a vehicle lamp which has an ABD function according to a comparison technology. This comparison technology must not be regarded as a known technology.

A vehicle lamp 1r includes a semiconductor light source 10 and a lighting circuit 20r. In the ABD, a high beam illuminating area is divided into a plurality of or N (N is a natural number of 2 or greater) sub-areas. The semiconductor light source 10 includes a plurality of light emitting devices 12_1 to 12_N which are associated individually with the N sub-areas. The light emitting devices 12 are semiconductor devices such as LEDs (Light Emitting Diodes) or LDs (Laser Diodes) and are disposed so as to illuminate the corresponding sub-areas. The lighting circuit 20r controls individually the on (turning on) and off (turning off) of the plurality of light emitting devices 12_1 to 12_N to thereby change the beam pattern or luminous intensity distribution of the high beam. Alternatively, the lighting circuit 20r PWM (Pulse Width Modulation) controls the light emitting devices 12 at high frequencies to thereby adjust the effective luminance.

The lighting circuit 20r includes a current supply 30r, a plurality of bypass circuits 40_1 to 40_N, and a controller 42. The current supply 30r receives a battery voltage $V_{BAT}$ (also referred to as an input voltage $V_{IN}$) from a battery 2 via a switch 4 and stabilizes a drive current $I_{DRV}$ which flows to the semiconductor light source 10 to a certain target amount.

The plurality of bypass circuits 40_1 to 40_N are associated individually with the plurality of light emitting devices 12_1 to 12_N. The bypass circuits 40 can be switched on and off. When an ith bypass circuit 40_i is switched on, the drive current $I_{DRV}$ flows not to the light emitting device 12_i but to the bypass circuit 40_i, and the light emitting device 12_i is turned off, while when the bypass circuit 40_i is switched off, the drive current $I_{DRV}$ flows to light emitting device 12_i to turn it on.

An upstream processor (for example, an electronic control unit) 6 which controls the vehicle lamp 1r determines on the sub-areas to be illuminated by the high beam and gives an instruction to the controller 42 of the lighting circuit 20r. The controller 42 controls the states of the bypass circuits 40_1 to 40_N based on a control command from the processor 6. Specifically, the controller 42 selects the light emitting devices 12 corresponding to the sub-areas to be illuminated and switches off the bypass circuits 40 which are parallel to the selected light emitting devices 12 while switching on the bypass circuits 40 which are parallel to the remaining light emitting devices 12.

PRIOR ART LITERATURES

Patent Literatures

[Patent Literature 1] JPA Publications No. 2008-205357
[Patent Literature 2] JPA Publications No. 2012-224317

The inventor and others have studied the vehicle lamp 1r shown in FIG. 1 and come to recognize the following problem. The vehicle lamp 1r shown in FIG. 1 is such that with the drive current $I_{DRV}$ made to remain constant at all times, the bypass circuits 40 are controlled to be switched on and off to change the light distribution pattern or the quantity of light of the semiconductor light source 10 as a whole.

The inventor and others have studied the application of the vehicle lamp 1r shown in FIG. 1 to a blade scanning ADB described in Patent Literature 2. The blade scanning technology is a technology in which a blade configured to reflect light from a light source is reciprocated or rotated at high speeds to scan a field ahead of a vehicle with reflected light to thereby form a light distribution pattern.

As a basic function of the ADB technology, a function is raised in which the existence of preceding and on-coming vehicles and pedestrians ahead the vehicle is detected and illuminating or sub-areas of a high beam which correspond to the vehicles and the pedestrians are shielded to thereby reduce the risk of dazzling the vehicles and the pedestrians (glare free). In the event that the vehicle lamp 1r shown in FIG. 1 is made use of, light can be on and off for each sub-area by controlling the bypass circuits 40, thereby making it possible to execute the glare free control.

On the other hand, in order to enhance the visibility of a driver, the ABD technology may additionally include (i) a function to increase relatively the luminance of a hot zone only and (ii) an electronic swiveling function in which the luminance distribution is changed based on steering information, that is, the luminance at a left end or a right end is increased. In attempting to realize these functions in the blade scanning vehicle lamp, the luminance of the light source needs to be changed according to the position of the blade which changes its position at high speeds. In the event that the vehicle lamp 1r shown in FIG. 1 is adopted, however, since the drive current $I_{DRV}$ is constant at all times, the quantities of light of all the illuminating areas become substantially constant.

SUMMARY OF THE INVENTION

The present invention has been made in view of these situations, and an illustrative object of one aspect of the present invention is to provide a vehicle lamp which can change luminance at high speeds.

According to an aspect of the present invention, there is provided a lighting circuit for using together with a semiconductor light source and making up a vehicle lamp, including a switching converter which supplies power to the semiconductor light source and a converter controller which controls the switching converter. The converter controller includes a current detection circuit configured to detect a current which is supplied from the switching converter to the semiconductor light source, a hysteresis comparator configured to compare a detected current value with an upper threshold voltage and lower threshold voltage to generate a control pulse according to the result of the comparison, a driver configured to switch a switching element of the switching converter according to the control pulse, and a threshold voltage generating circuit configured to receive a variable control voltage which indicates a target current amount to generate an upper threshold voltage and a lower threshold voltage according to the control voltage received.

According to this aspect, the luminance (the quantity of light) of the semiconductor light source can be changed with time by changing the control voltage, and since an error amplifier does not exist in a feedback system of this lighting circuit, a high response can be realized, thereby making it possible to change the luminance at high speeds.

The threshold voltage generating circuit may maintain constant a potential difference between the upper threshold voltage and the lower threshold voltage irrespective of the magnitude of the control voltage.

This can reduce noise attributed to a change in frequency of the switching converter.

The control voltage may change down as a lower voltage limit where the lower threshold voltage becomes 0V.

This can suppress the change in switching frequency.

The threshold voltage generating circuit may include a first resistor and a second which have equal resistance values and which are provided in series between a control line to which the control voltage is given and a ground line to which a ground voltage is given, a third resistor of which a first end is connected to an output node which is a connecting point of the first resistor and the second resistor, and a voltage supply configured to generate a first voltage which is lower by a differential voltage which corresponds to a target value of the potential difference than the control voltage and a second voltage which is higher by the differential voltage than a ground voltage. (i) A first state in which the first voltage is applied to a second end of the third resistor to thereby generate the upper threshold voltage in the output node and (ii) a second state in which the second voltage is applied to the second end of the third resistor to thereby generate the lower threshold voltage in the output node may be configured to be switched according to the control pulse.

According to this aspect of the present invention, the upper threshold voltage and the lower threshold voltage can be changed according to the control voltage while the potential difference between the upper and lower threshold voltages are being maintained constant.

The threshold voltage generating circuit may be configured so as to adjust a target value of the potential difference according to an input voltage and an output voltage of the switching converter. This can maintain the switching frequency constant.

The voltage supply may include a first output terminal configured to generate the first voltage, a second output terminal configured to generate the second voltage, a fourth resistor which is provided between the control line and the first output terminal and a current supply which is provided between the first output terminal and the second output terminal to generate a control current which is adjusted according to the control voltage and the input voltage and the output voltage of the switching converter.

The voltage supply may include a first output terminal configured to generate the first voltage, a second output terminal configured to generate the second voltage, a fourth resistor which is provided between the control line and the first output terminal, a first transistor which is provided between the first output terminal and the second output terminal, a fifth resistor which is provided between the second output terminal and the ground line, an error amplifier having a first input and a second input, a sixth resistor which is provided between a control terminal of the first transistor and an output of the error amplifier, a seventh resistor which is provided between a power supply line to which a power supply voltage is given and the output of the error amplifier, an eighth resistor which is provided the first input of the error amplifier and the second output terminal, a ninth resistor which is provided between an input line to which an input voltage is given and the first input of the error amplifier, a tenth resistor which is provided between the control line and the second input of the error amplifier, an eleventh resistor which is provided an output line to which an output voltage of the switching converter is given and the second input of the error amplifier, and a twelfth resistor which is provided between the second input of the error amplifier and the ground line.

According to this configuration, the potential difference of the upper threshold voltage and the lower threshold voltage can be changed according to the input voltage and the output voltage, thereby making it possible to maintain the switching frequency constant.

The threshold voltage generating circuit may include a thirteenth resistor of which one end is connected to a control line to which the control voltage is given, a first current supply which sources a supply of an amount of constant current according to a target value of the potential difference to a second end of the thirteenth resistor, and a second current supply which sinks the constant current from the second end of the thirteenth resistor. (i) A first state in which the first current supply is connected to the second end of the thirteenth resistor to thereby generate the upper threshold voltage in the second end and (ii) a second state in which the second current supply is connected to the second end of the thirteenth resistor to thereby generate the lower threshold voltage in the second end may be configured so as to be switched.

According to this aspect of the present invention, the upper threshold voltage and the lower threshold voltage can be changed while the upper threshold voltage and the lower threshold voltage are being maintained constant.

The semiconductor light source may include a plurality of light emitting devices which are connected in series. The lighting circuit may include further N (N is a natural number) bypass circuits which are associated individually with N light emitting devices of the plurality of light emitting devices and which are provided in parallel to the corresponding light emitting devices.

By adopting this configuration, the quantity of light of the semiconductor light source can be changed not only by changing the control voltage but also by controlling the bypass circuits. In particular, in the event that the control voltage is made to change to such an extent that the lower threshold voltage becomes 0V or greater, although the quantity of light cannot be controlled in an area which is lower than a lower limit value of the control voltage, according to this aspect of the present invention, the quantity of light can also be controlled in areas where the quantity of light is small.

The switching converter may be a Cuk converter.

By using the Cuk converter, the following characteristics to the change in control voltage can be enhanced.

Another aspect of the present invention relates to a vehicle lamp. The vehicle lamp may include a semiconductor light source, a lighting circuit for lighting the semiconductor light source and a blade which is disposed so as to receive light emitted from the semiconductor light source to shine reflected light to the front of the vehicle and which repeats a predetermined periodical motion. The control voltage given to the lighting circuit may change periodically in synchronism with the periodical motion.

Arbitrary combinations of the constituent elements that have been described heretofore and substitutions of the constituent elements and expressions of the present invention in relation to method, device, system and the like are also effective as aspects of the present invention.

According to the aspects of the present invention, it is possible to the vehicle lamp which can change the luminance at high speeds.

DETAILED DESCRIPTION

Figure 1:
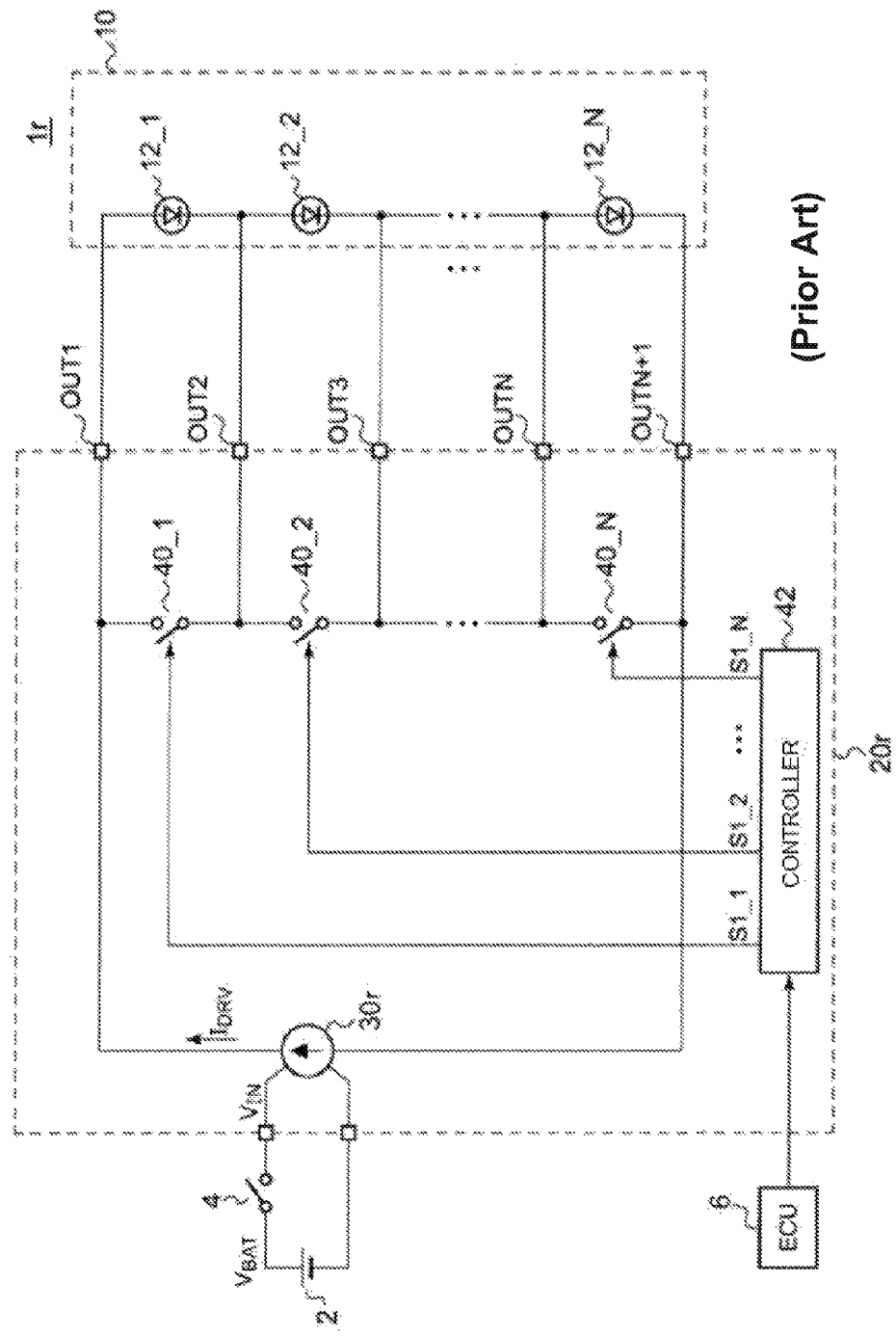
FIG. 1 is a block diagram of a vehicle lamp having an ADB function according to the comparison technology.

Hereinafter, referring to the accompanying drawings, the present invention will be described based on a preferred embodiment thereof. Like reference numerals will be given to like or similar constituent elements, members and processes shown in the drawings, and repeated descriptions will be omitted as required. Additionally, an embodiment is intended not to limit the present invention but to illustrate the present invention, and all characteristics which will be described in the embodiment and combinations of the characteristics are not always essential to the present invention.

In this specification, a "state in which a member A is connected to a member B" includes not only a state in which the member A is connected directly to the member B but also a state in which the member A is connected indirectly to the member B via a further member which does not affect substantially the state in which the member A is connected electrically to the member B or which does not damage the function and effect which are provided by the electrical connection between the member A and the member B.

Similarly, a "state in which a member C is provided between a member A and a member B" includes not only a state in which the member A and the member C or the member B and the member C are connected directly to each other but also a state in which the member A and the member C or the member B and the member C are connected indirectly to each other via a further member which does not affect substantially the state in which the member A and the member C or the member B and the member C are connected electrically to each other or which does not damage the function and effect which are provided by the electrical connection between the member A and the member C or the member B and the member C.

Additionally, in this specification, reference numerals given to electric signals such as voltage signals, current signals and the like or circuit elements such as resistors, capacitors and the like denote voltage values and current values of the voltage signals and the current signals or resistance values of the resistors and capacity values of the capacitors.

Figure 2:
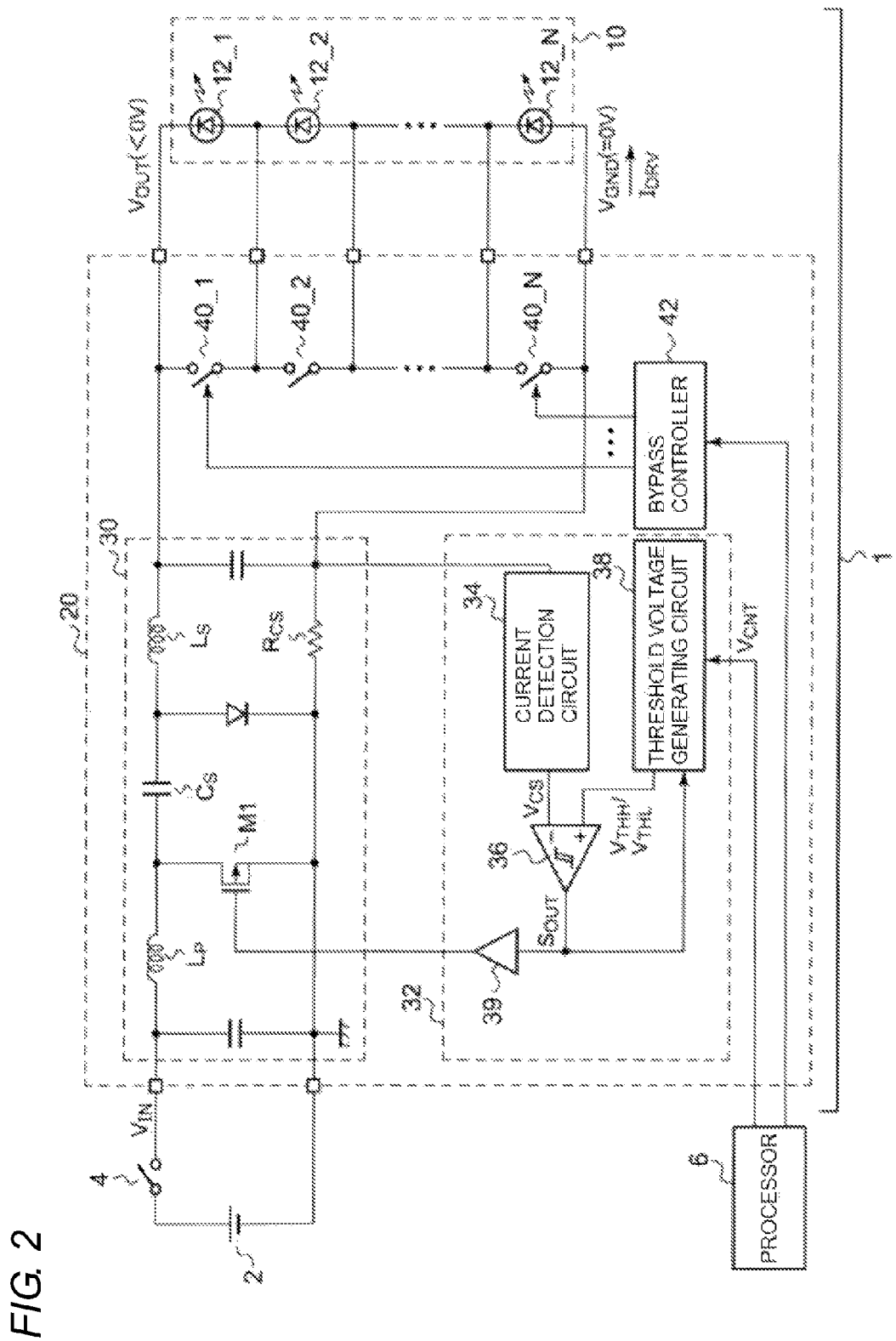
FIG. 2 is a block diagram of a vehicle lamp according to an embodiment of the present invention.

FIG. 2 is a block diagram of a vehicle lamp 1 according to this embodiment. The vehicle lamp 1 includes a semiconductor light source 10 and a lighting circuit 20. The semiconductor light source 10 includes a plurality of light emitting devices 12_1 to 12_N which are connected in series. The lighting circuit 20 is used together with the semiconductor light source 10 and makes up the vehicle lamp 1. The light emitting devices 12 are, for example, LEDs (Light Emitting Diodes).

The lighting circuit 20 includes a switching converter 30, a converter controller 32, one or a plurality of bypass circuits 40_1 to 40_N (N is a natural number), a bypass controller 42.

A battery voltage $V_{IN}$ is supplied from a battery 2 to the switching converter 30 via a switch 4. The switching converter 30 supplies a drive current $I_{DRV}$ according to a target luminance to the semiconductor light source 10. For example, the switching converter 30 is a boosting type or step-down type converter. In FIG. 2, a Cuk type converter is shown. Since the topology of the Cuk converter is known, the description thereof will be omitted here.

The bypass circuits 40_1 to 40_N are associated individually with N (N is a natural number) light emitting devices 12 in the plurality of light emitting devices 12. In this embodiment, the bypass circuits 40 are described as being provided for all the light emitting devices 12. The bypass circuit 40_i is provided parallel to the corresponding light emitting device 12_i. The bypass circuit 40_i can be switched between an ON state and an OFF state, and when in the ON state, the bypass circuit 40_i is configured to form a bypass line which is parallel to the light emitting device 12_i. The bypass controller 42 controls the plurality of bypass circuits 40_1 to 40_N to be in the ON state or in the OFF state according to a control command from an upstream processor 6.

The converter controller 32 receives a control voltage $V_{CNT}$ according to the control command from the processor 6 and changes dynamically the drive current $I_{DRV}$ which is supplied from the switching controller 30 to the semiconductor light source 10 according to the control voltage $V_{CNT}$.

The converter controller 32 includes a current detection circuit 34, a hysteresis comparator 36, a threshold voltage generating circuit 38 and a driver 39.

The current detection circuit 34 detects the drive current $I_{DRV}$ which is supplied from the switching converter 30 to the semiconductor light source 10. For example, the switching converter 30 includes a current detection resistor $R_{CS}$ which is provided on a path of the drive current $I_{DRV}$. A voltage drop (referred to as a detection voltage) which is proportional to the drive current $I_{DRV}$ is generated in the current detection resistor $R_{CS}$. The current detection circuit 34 generates a detection signal $V_{CS}$ which signals an amount of the drive current $I_{DRV}$ according to the voltage drop in the current detection resistor $R_{CS}$.

The hysteresis comparator 36 compares the detection value $V_{CS}$ of the drive current $I_{DRV}$ with an upper threshold voltage $V_{THH}$ and a lower threshold voltage $V_{THL}$ and generates a control pulse $S_{OUT}$ according the result of the comparison made. The driver 39 switches a switching element M1 of the switching controller 30 according to the control pulse $S_{OUT}$. For example, the driver 30 switches on a switching transistor M1 during a length of time when the control pulse $S_{OUT}$ is at a high level and switches off the switching transistor M1 during a length of time when the control pulse $S_{OUT}$ is at a low level.

The threshold voltage generating circuit 38 receives a variable control voltage $V_{CNT}$ which indicates a target value $I_{REF}$ of the drive current $I_{DRV}$. The threshold voltage generating circuit 38 generates an upper threshold voltage $V_{THH}$ and a lower threshold voltage $V_{THL}$ according to the control voltage $V_{CNT}$. Here, the threshold voltage generating circuit 38 maintains a potential difference $\Delta V$ between the upper threshold voltage $V_{THH}$ and the low threshold voltage $V_{THL}$ constant, irrespective of the magnitude of the control voltage $V_{CNT}$.

The output $S_{OUT}$ of the hysteresis comparator 36 is inputted into the threshold voltage generating circuit 38. The threshold voltage generating circuit 38 supplies one of the two threshold voltages $V_{THH}$, $V_{THL}$ which corresponds to the level of the control pulse $S_{OUT}$ to a non-inverting input terminal of the hysteresis comparator 36. Specifically, the threshold voltage generating circuit 38 outputs $V_{THH}$ when the control pulse $S_{OUT}$ is at the high level and outputs $V_{THL}$ when the control pulse $S_{OUT}$ is at the low level.

The control voltage $V_{CNT}$ changes down to a lower limit voltage level at which the lower threshold voltage $V_{THL}$ becomes 0V.

Figure 3A:
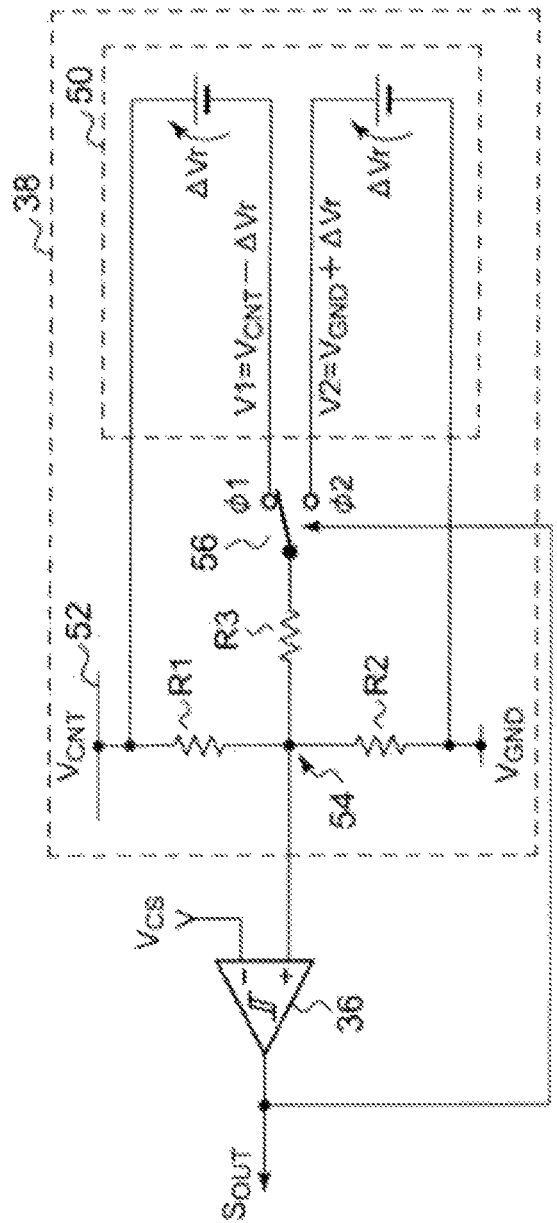
FIGS. 3A and 3B are circuit diagrams depicting configuration examples of threshold voltage generating circuits.
Figure 3B:
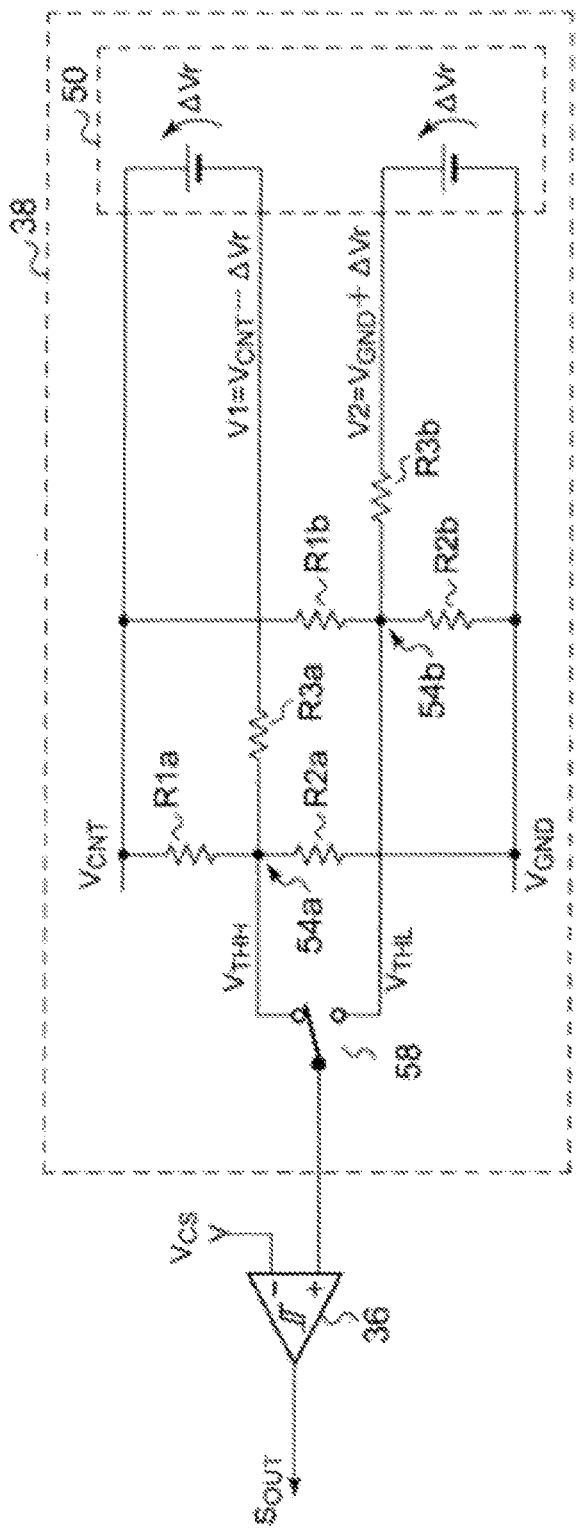

FIGS. 3A and 3B are circuit diagrams showing configuration examples of threshold voltage generating circuits 38. A threshold voltage generating circuit 38 shown in FIG. 3A includes a first resistor R1, a second resistor R2, a third resistor R3 and a voltage supply 50. A control voltage $V_{CNT}$ is given to a control line 52. The first resistor R1 and the second resistor R2 are provided in series. The first resistor R1 and the second resistor R2 have equal resistance values. A first end of the third resistor R3 is connected to an output node 54 which is a connecting point between the first resistor R1 and the second resistor R2.

The voltage supply 50 generates a first voltage V1 ($=V_{CNT}-\Delta Vr$) which is lower by a differential voltage $\Delta Vr$ according to a target value of a potential difference $\Delta V$ than the control voltage $V_{CNT}$ and a second voltage V2 ($=V_{GND}+\Delta Vr=\Delta Vr$) which is higher by the differential voltage $\Delta Vr$ than a ground voltage $V_{GND}$ ($=0V$).

The threshold voltage generating circuit 38 is configured so that a first state $\phi 1$ and a second state $\phi 2$ can be switched over according to the control pulse $S_{OUT}$. In the first state $\phi 1$, the first voltage V1 is applied to a second end of the third resistor R3 to thereby generate an upper threshold voltage $V_{THH}$ in the output node 54. In the second state $\phi 2$, the second voltage V2 is applied to the second end of the third resistor R3 to thereby generate a lower threshold voltage $V_{THL}$ in the output node 54.

In the configuration shown in FIG. 3A, in order to switch the states between the first state $\phi 1$ and the second state $\phi 2$, a selector 56 is provided. The selector 56 selects the first voltage V1 during a length of time when the control pulse $S_{OUT}$ is at the high level and the switching transistor M1 is on (the first state $\phi 1$). On the other hand, the selector 56 selects the second voltage V2 during a length of time when the control pulse $S_{OUT}$ is at the low level and the switching transistor M1 is off (the second state $\phi 2$).

The threshold voltage generating circuit 38 shown in FIG. 3A is equivalent to the threshold voltage generating circuit 38 shown in FIG. 3B. In the threshold voltage generating circuit 38 shown in FIG. 3B, two sets of first resistors R1, second resistors R2 and third resistors R3 (resistors of each set are distinguished by subscripts a, b) to switch between the first state $\phi 1$ and the second state $\phi 2$, and another selector 58 is provided. The first voltage V1 is inputted into a third resistor R3a of a first set, and the second voltage V2 is inputted into a third resistor R3b of a second set. The upper threshold voltage $V_{THH}$ is generated in an output node 54a of the first set, and the lower threshold voltage $V_{THL}$ is generated in an output node 54b of the second set. The selector 58 selects the upper threshold value $V_{THH}$ during a length of time when the control pulse $S_{OUT}$ is at the high level and the switching transistor M1 is on (the first state $\phi 1$). On the other hand, the selector 58 selects the lower threshold voltage $V_{THL}$ during a length of time when the control pulse $S_{OUT}$ is at the low level and the switching transistor M1 is off (the second state $\phi 2$).

In the event of R1=R2, according to the threshold voltage generating circuit 38 according to FIG. 3A or FIG. 3B, the following threshold voltages $V_{THH}$, $V_{THL}$ can be generated for each of the first state $\phi 1$ and the second state $\phi 2$.

$$V_{THH}=V_{CNT}/2+R1/(R1+2\times R3)\times(V_{CNT}/2-\Delta Vr)$$

$$V_{THL}=V_{CNT}/2-R1/(R1+2\times R3)\times(V_{CNT}/2-\Delta Vr)$$

$$\Delta V=V_{THH}-V_{THL}=2\times R1/(R1+2\times R3)\times(V_{CNT}/2-\Delta Vr)$$

Preferably, the threshold voltage generating circuit 38 is configured so that the target value of the potential difference $\Delta V$ can be adjusted according to the input voltage $V_{IN}$ and the output voltage $V_{OUT}$ of the switching converter 30. The target value of the potential difference $\Delta V$ is adjusted so that the switching frequency (the switching period) of the switching converter 30 becomes constant.

Figure 4:
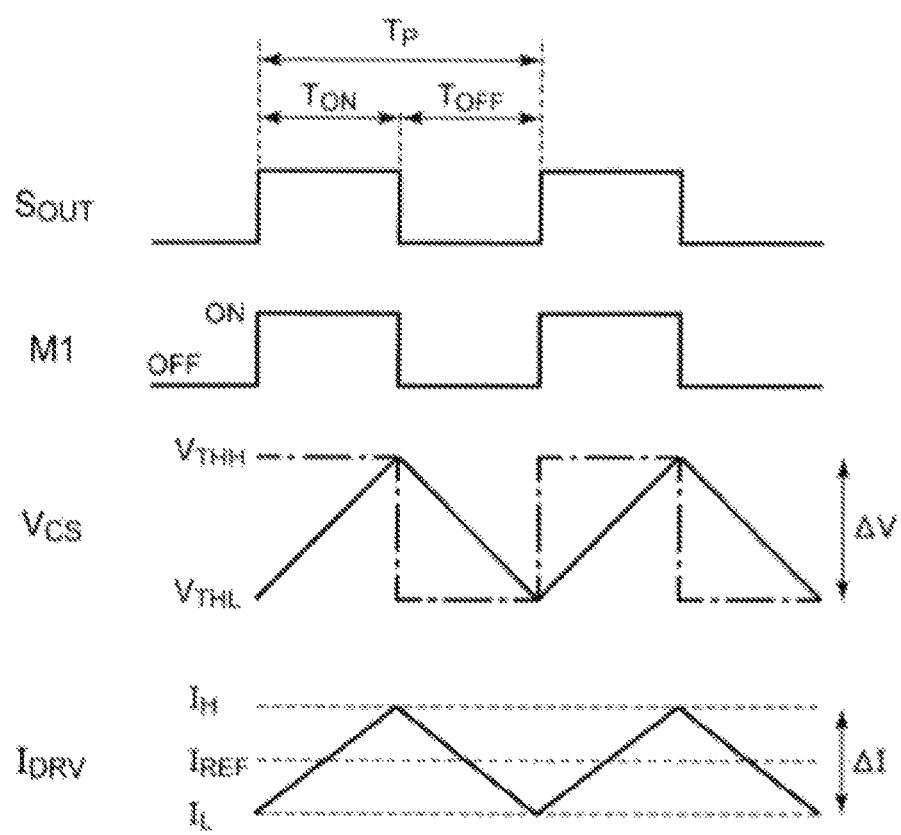
FIG. 4 is a waveform diagram showing the operation of a switching converter.

FIG. 4 is waveform diagram showing the operation of the switching converter 30. An increment $\Delta_{ION}$ of an output current $I_{DRV}$ during an ON time $T_{ON}$ of the switching transistor M1 is given by an expression (1).

$$\Delta I_{ON}=(V_{IN}/L_S)\times T_{ON} \qquad (1)$$

Similarly, a decrement $\Delta I_{OFF}$ of the output current $I_{DRV}$ during an OFF time $T_{OFF}$ of the switching transistor M1 is given by an expression (2).

$$\Delta I_{OUT} = (V_{OUT}/L_S) \times T_{OFF} \quad (2)$$

In a steady state, $\Delta I_{ON} = \Delta I_{OFF} = \Delta I$ is established.

Expressions (3) and (4) are obtained from the expressions (1) and (2).

$$T_{ON} = \Delta I \times L_S / V_{IN} \quad (3)$$

$$T_{OFF} = \Delta I \times L_S / V_{OUT} \quad (4)$$

Consequently, a relation (5) is obtained as a condition for maintain the switching frequency (the switching period) $T_p = T_{ON} + T_{OFF}$ constant.

$$T_p = T_{ON} + T_{OFF} = \Delta I \times L_S \times (1/V_{IN} + 1/V_{OUT}) = K \text{ (where } K \text{ is a constant) } \Delta I = K/L_S/(1/V_{IN} + 1/V_{OUT}) \quad (5)$$

Since the inductance of the coil $L_S$ is regarded as being constant, an expression (5a) is obtained.

$$\Delta I = Ka/(1/V_{IN} + 1/V_{OUT}) \quad (5a)$$

A proportional relationship is established between the ripple $\Delta I$ of the current and the ripple width $\Delta V$ of the detection voltage $V_{CS}$. Consequently, the switching frequency can be maintained constant by adjusting the potential difference $\Delta V$ according to the input voltage $V_{IN}$ and the output voltage $V_{OUT}$ so as to satisfy an expression (5b).

$$\Delta V = Kb/(1/V_{IN} + V_{OUT}) \quad (5b)$$

In the event of R1=R2, the potential difference $\Delta V$ between the two threshold voltages $V_{THH}$, $V_{THL}$ which are generated by the threshold voltage generating circuits 38 shown in FIGS. 3A and 3B is given by an expression (6).

$$\Delta V = V_{THH} - V_{THL} = 2 \times R1/(R1 + 2 \times R3) \times (V_{CNT}/2 - \Delta Vr) \quad (6)$$

Consequently, $\Delta Vr$ may be generated so as to satisfy an expression (7).

$$\Delta Vr = V_{CNT}/2 - \Delta V(2 \times R1) \times (R1 + 2 \times R3) \quad (7)$$
$$= V_{CNT}/2 - Kb/(1/V_{IN} + 1/V_{OUT})/(2 \times R1) \times (R1 + 2 \times R3)$$

Figure 5A:
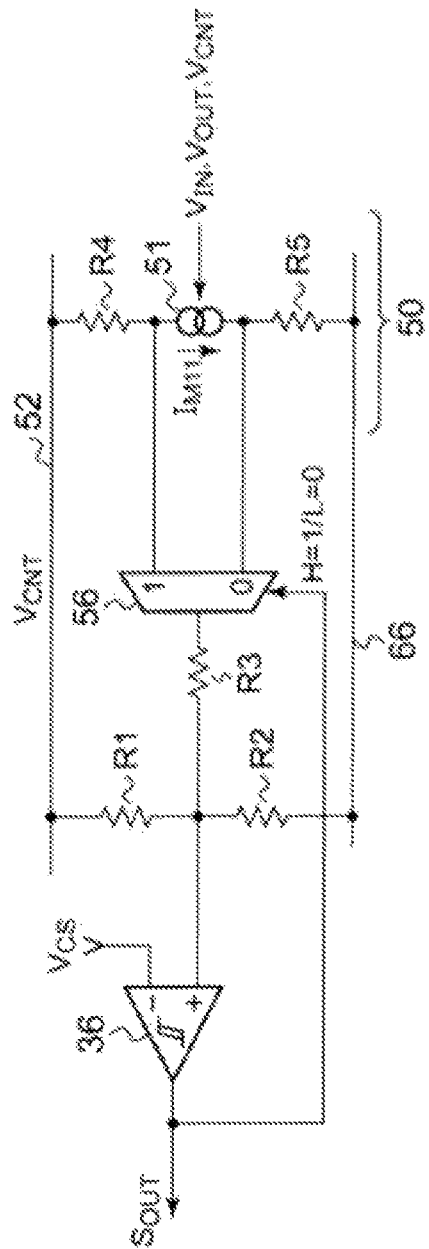
FIGS. 5A and 5B are circuit diagrams of configuration examples of threshold voltage generating circuits which can control a switching frequency in a constant fashion.
Figure 5B:
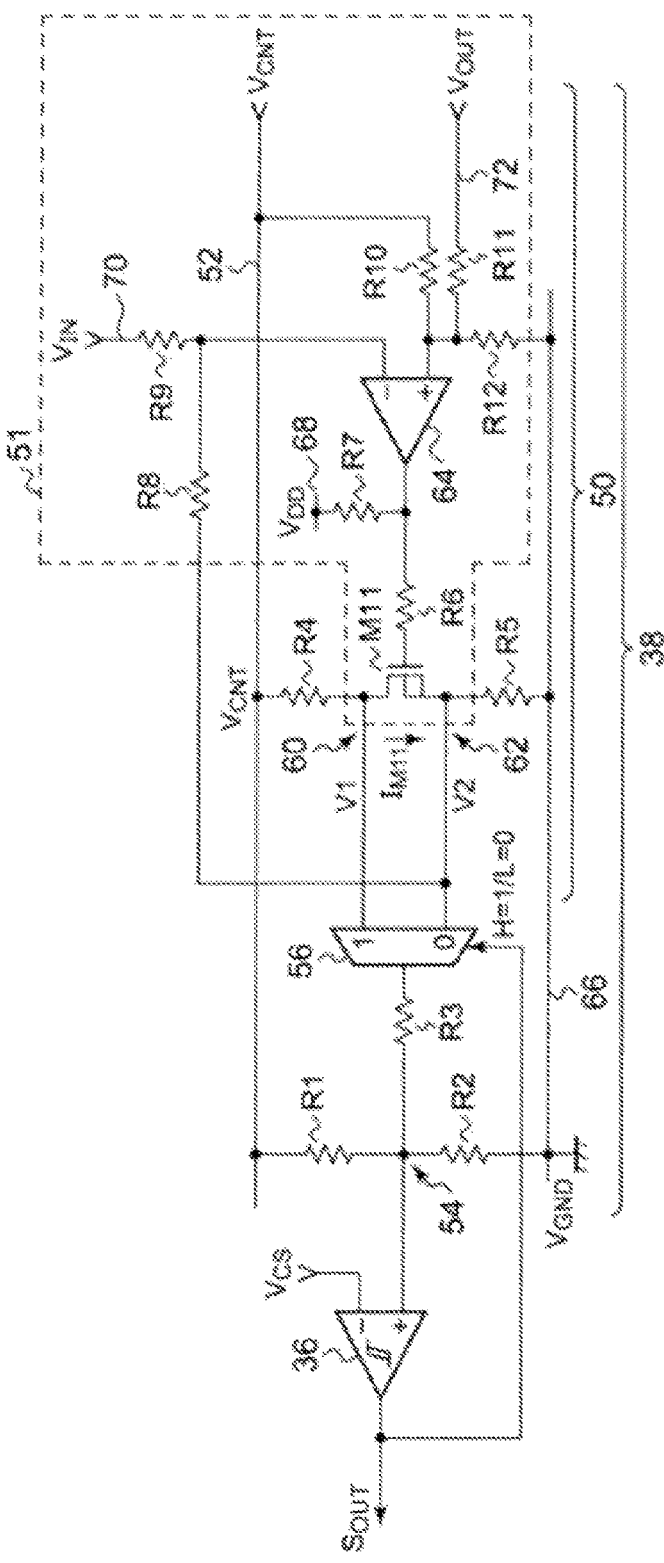

FIGS. 5A and 5B are circuit diagrams of configuration examples of threshold voltage generating circuits 38 which can control the switching frequency to be constant. A voltage supply 50 includes a first output terminal 60, a second output terminal 62, a fourth resistor R4, a fifth resistor R5 and a current supply 51. The fourth resistor R4 is provided between a control line 52 and the first output terminal 60. The fifth resistor R5 is provided between the second output terminal 62 and a ground line 66. The current supply 51 is provided between the first output terminal 60 and the second output terminal 62 to generate a control current $I_{M11}$ according to the control voltage $V_{CNT}$, the input voltage $V_{IN}$ and the output voltage $V_{OUT}$.

The first voltage V1 and the second voltage V2 are expressed by the following expression by using the current $I_{M11}$.

$$V1 = V_{CNT} - R4 \times I_{M11}$$

$$V2 = R5 \times I_{M11}$$

Assuming R4=R5=R, $\Delta Vr = R \times I_{M11}$ is established.

FIG. 5B shows a more specific configuration example than one shown in FIG. 5A. A current supply 51 includes resistors R6 to R12, a first transistor M11, and an error amplifier 64. The first transistor M11 is an N-channel MOSFET (Metal Oxide Semiconductor Field Effect Transistor) and is provided a first output terminal 60 and a second output terminal 62.

The error amplifier 64 has a first input (an inverting input terminal (−)) and a second input (a non-inverting input terminal (+)). A sixth resistor R6 is provided between a control terminal (a gate) of the first transistor M11 and an output of the error amplifier 64. A seventh resistor R7 is provided between a power supply line 68 to which a power supply voltage $V_{DD}$ is given and the output of the error amplifier 64. An eighth resistor R8 is provided between the first input (−) of the error amplifier 64 and the second output terminal 62. A ninth resistor R9 is provided between an input line 70 to which an input voltage $V_{IN}$ is given and the first input (−1) of the error amplifier 64. A tenth resistor R10 is provided between the control line 52 and the second input (+) of the error amplifier 64. An eleventh resistor R11 is provided between an output line 72 to which the output voltage $V_{OUT}$ of the switching converter 30 is given and the second input (+) of the error amplifier 64. A twelfth resistor R12 is provided between the second input (+) of the error amplifier 64 and the ground line 66.

In the threshold voltage generating circuit 38 shown in FIG. 5B, the second voltage V2 (=$\Delta Vr$) is approximated by an eighth expression (8). This approximate expression is induced from a regression analysis.

$$V2 = \Delta Vr = -0.04399 \times V_{IN} - 0.01393 \times V_{OUT} + (R8/R9 + 1) \times (V_{CNT}/R10)/(1/R10 + 1/R11 + 1/R12) \quad (8)$$

This can adjust the potential difference $\Delta V$ between the upper threshold voltage $V_{THH}$ and the lower threshold voltage $V_{THL}$ according to the input voltage $V_{IN}$ and the output voltage $V_{OUT}$ to thereby maintain the switching frequency constant.

Thus, the configuration of the lighting circuit 20 has been described heretofore. Following this, the operation thereof will be described.

Figure 6:
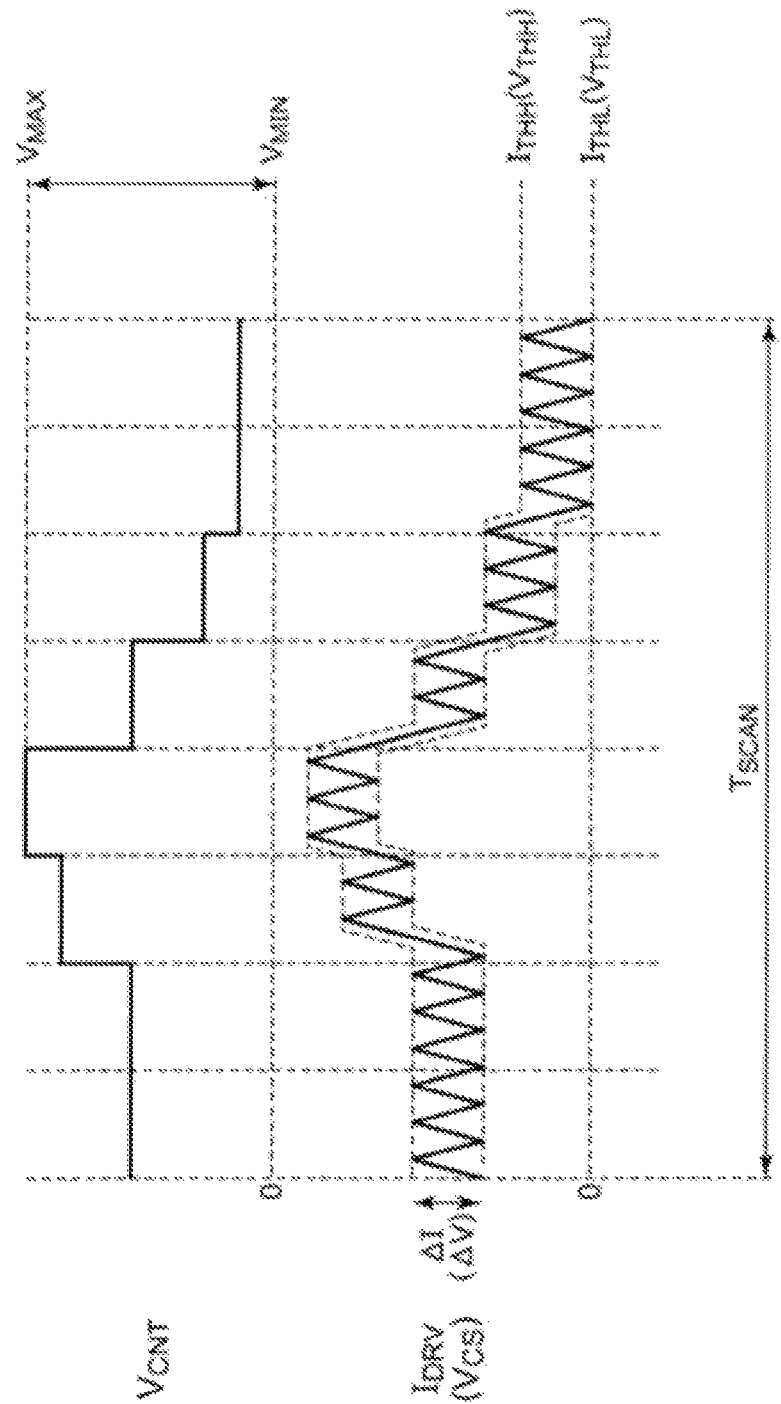
FIG. 6 is a waveform diagram showing the operation of a lighting circuit.

FIG. 6 is a waveform diagram showing the operation of the lighting circuit 20. The control voltage $V_{CNT}$ changes with time. The upper threshold voltage $V_{THH}$ and the lower threshold voltage $V_{THL}$ change according to the control voltage $V_{CNT}$. This enables a peak value $I_{THH}$ and a bottom value $I_{THL}$ of the drive current $I_{DRV}$ to change according to the control voltage $V_{CNT}$, whereby an effective value (a mean value) of the drive current $I_{DRV}$ can be changed according to the control voltage $V_{CNT}$.

Additionally, the switching frequency can be made constant by maintaining the potential difference (the voltage ripple) $\Delta V$ between the two threshold voltages $V_{THH}$, $V_{THL}$ at a certain target value, thereby making it possible to reduce noise.

The input voltage $V_{IN}$ and the output voltage $V_{OUT}$ of the switching converter 30 can change on a long time scale or a short time scale. Then, even though the input voltage $V_{IN}$ or the output voltage $V_{OUT}$ changes, the switching frequency can be maintained constant by changing the target value of the potential difference $\Delta V$ based on the input voltage $V_{IN}$ and the output voltage $V_{OUT}$, and further, noise can be reduced.

When the control voltage $V_{CNT}$ is decreased with no limitation, in such a state that the lower threshold voltage $V_{THL}$ is clamped at 0V, only the upper threshold voltage $V_{THH}$ decreases. In this state, the effective value of the drive current $I_{DRV}$ decreases, while the switching frequency rises. Then, the constancy of the switching frequency can be ensured by setting a lower limit $V_{MIN}$ of a changing range of the control voltage $V_{CNT}$ at a level where the lower threshold voltage $V_{THL}$ becomes 0V (the bottom current $I_{THL}$ becomes 0A) or higher.

Figure 7:
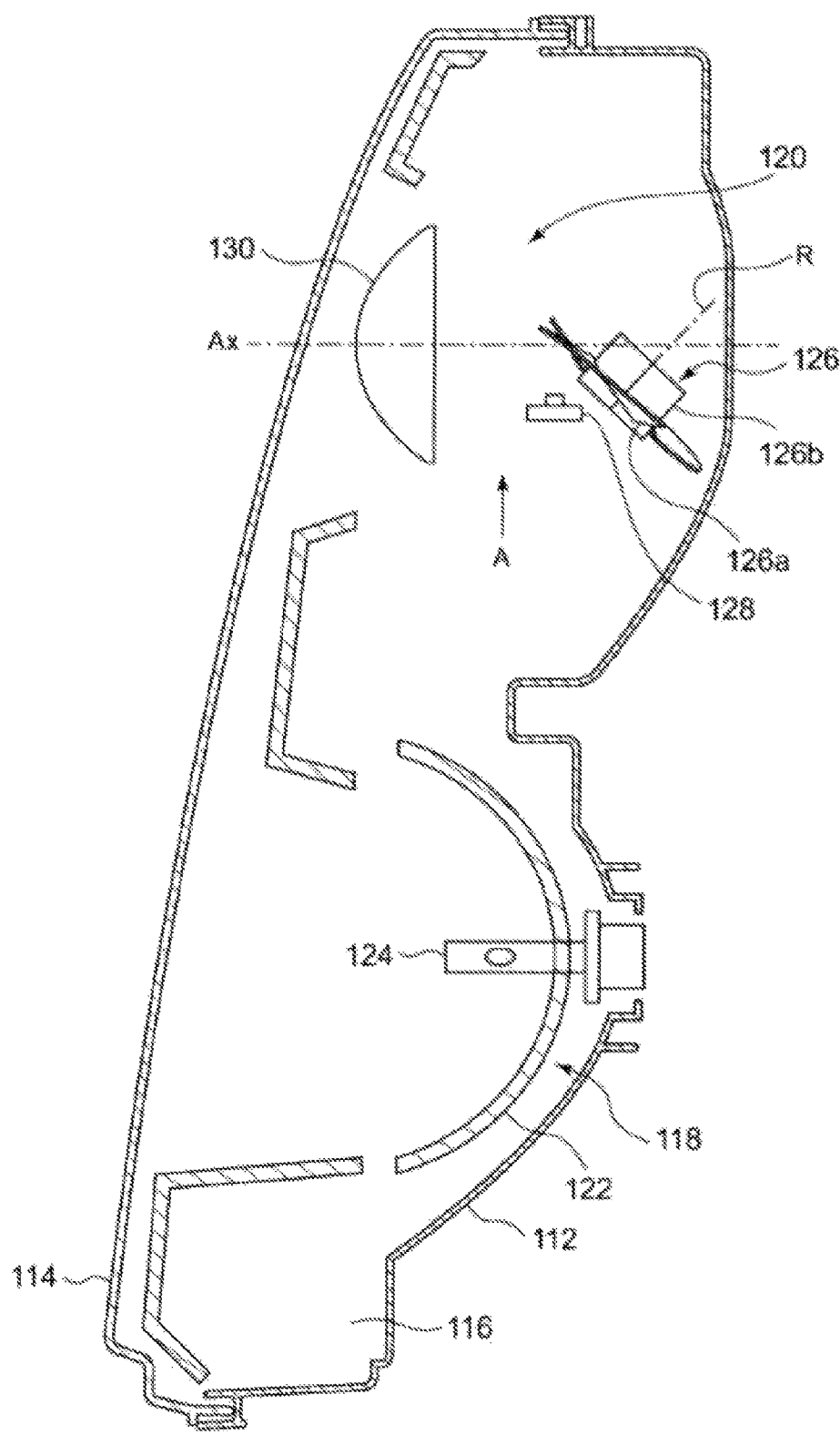
FIG. 7 is a horizontal sectional view of a vehicle lamp including the lighting circuit according to the embodiment.

FIG. 7 is a horizontal sectional view of the vehicle lamp 1 (a vehicle headlamp) which includes the lighting circuit 20 according to this embodiment. The vehicle headlamp 1 is a right-hand side headlamp which is mounted at a front right-hand end portion of a motor vehicle and is identical in construction to a left-hand side headlamp which is mounted at a front left-hand end portion of the motor vehicle except that they are symmetrical with each other laterally. Because of this, in the following description, the right-hand side vehicle headlamp 1 will be described in detail, and the description of the left-hand side vehicle headlamp will be omitted here.

As shown in FIG. 7, the vehicle headlamp 1 includes a lamp body 112 which has a recess portion which is opened to the front. In the lamp body 112, its front opening is covered by a transparent front cover 114 to define a lamp compartment 116. The lamp compartment 116 functions as a space where two lamp units 118, 120 are accommodated in such a state that the lamp units are disposed in line in a vehicle's width direction.

In the right-hand side vehicle headlamp 1, of these lamp units, the outboard lamp unit, that is, the lamp unit 120 which is disposed upper as seen in FIG. 7 is a lamp unit including a lens and is configured to emit a variable high beam. On the other hand, in the right-hand side vehicle headlamp 1, of these lamp units, the inboard lamp unit, that is, the lamp unit 118 which is disposed lower as seen in FIG. 7 is configured to emit a low beam.

The low beam lamp unit 118 has a reflector 122, a light source bulb (an incandescent bulb) 124 which is supported by the reflector 122 and a shade, not shown. The reflector 122 is supported so as to tilt freely relative to the lamp body 112 by, for example, a device using an aiming screw and nut.

As shown in FIG. 7, the lamp unit 120 includes a rotary reflector 126, an LED 128 (the semiconductor light source 10 described above), a convex lens 130 which is a projection lens disposed in front of the rotary reflector 126. A semiconductor light emitting device such as an EL device or an LD device can also be used as a light source in place of the LED 128. In particular, in a control for cutting off part of light distribution pattern, a light source is preferable which can be turned on and off accurately within a short period of time. Although the shape of the convex lens 130 may be selected as required according to required luminous intensity characteristics such as light distribution pattern or illuminance distribution, an aspheric lens or a free curved lens is used. In this embodiment, an aspheric lens is used as the convex lens 130.

The rotary reflector 126 is caused to rotate in one direction about a rotating axis R by a drive source such as a motor not shown. Additionally, the rotary reflector 126 includes a reflecting surface which reflects light emitted from the LED 128 while rotating so as to form a desired light distribution pattern. In this embodiment, the rotary reflector 126 makes up an optical unit.

Figure 8:
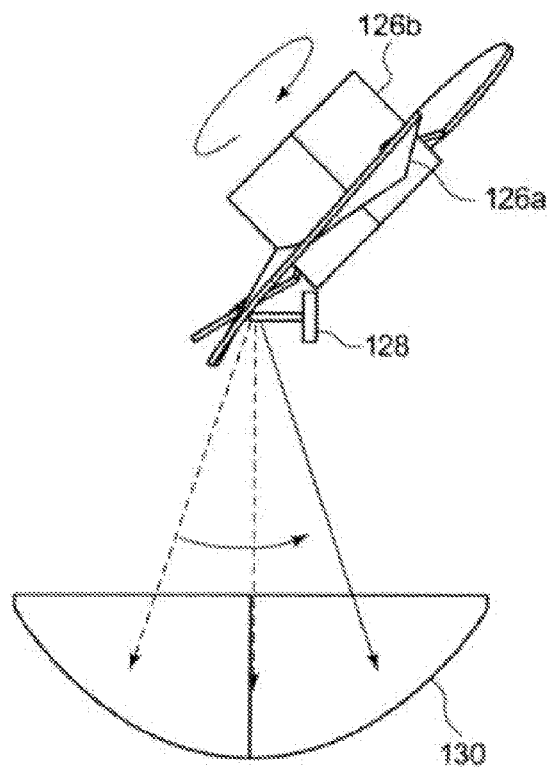
FIG. 8 is a plan view which shows schematically the configuration of a lamp unit including an optical unit according to the embodiment.
Figure 9:
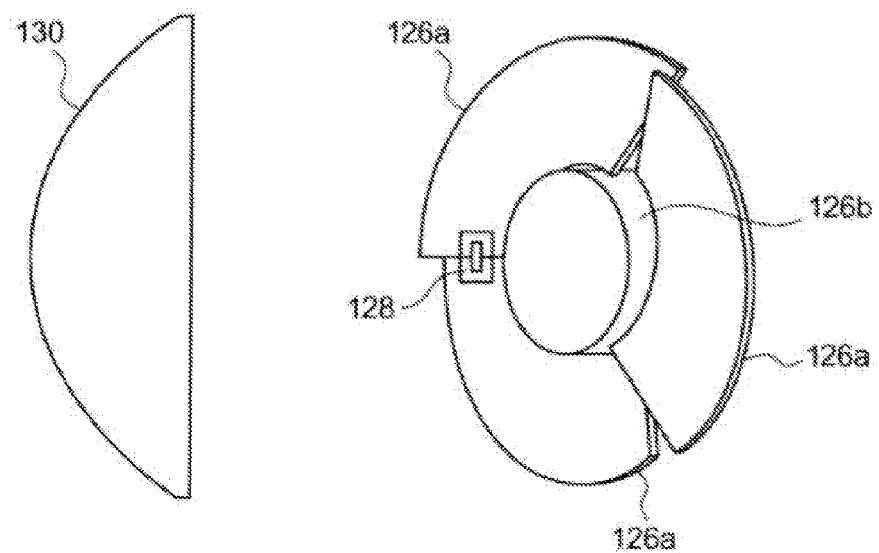
FIG. 9 is a side view of the lamp unit as seen from a direction A indicated in FIG. 7.

FIG. 8 is a top view showing schematically the configuration of the lamp unit 120 which includes the optical unit according to this embodiment. FIG. 9 is a side view of the lamp unit 120 as seen from a direction A shown in FIG. 7.

The rotary reflector 126 has three blades 126a, functioning as the reflecting surface, which have the same shape and which are provided on the periphery of a cylindrical rotating portion 126b. The rotating axis R of the rotary reflector 126 is inclined relative to an optical axis Ax and is provided in a plane which contains the optical axis Ax and the LED 128. In other words, the rotating axis R is provided substantially parallel to a scanning plane of light (illumination beam) of the LED 128 which scans in a left-to-right direction by rotating. This enables the optical unit to be made thin. Here, the scanning plane can be taken as a fan-shaped plane which is formed by continuously connecting loci of the light of the LED 128 which is scanning light.

Additionally, in the lamp unit 120 according to this embodiment, the LED 128 provided is relatively small and is disposed in a position which lies between the rotary reflector 126 and the convex lens 130 and deflects from the optical axis Ax. Because of this, compared with a conventional projector lamp unit in which a light source, a reflector and a lens are arranged in line on an optical axis, a depth direction (a front-to-rear direction of the vehicle) of the vehicle headlamp 1 can be shortened.

The shape of the blades 126a of the rotary reflector 126 is configured so that a secondary light source of the LED 128 due to reflection is formed near a focal point of the convex lens 130. Additionally, the blades 126a have a twisted shape so that an angle formed by the optical axis Ax and the reflecting surface changes as the blades 126a extend in a circumferential direction which is centered at the rotating axis R. This enables a scanning which uses the light of the LED 128 as shown in FIG. 8.

A scanning period $T_{SCAN}$ of an illuminated image which is obtained by a periodical motion (a rotating motion) of the blades 126a is of the order of 20 ms (50 Hz) to 5 ms (200 Hz) and cannot be sensed by the human eyes.

The lighting circuit 20 according to this embodiment can preferably be used for a blade scanning vehicle lamp. The control voltage $V_{CNT}$ can be changed in association with the periodical motion (displacement) of the blades 126a, whereby the intensity of light can be increased or decreased for each illuminating position, thereby making it possible to form an arbitrary illumination pattern. Specifically, with the lighting circuit 20, it is possible to realize an electronic swiveling function in which (i) the luminance of only the hot zone of the illumination area is enhanced relatively and (ii) the luminance distribution is changed based on steering information, that is, the luminance at the left end or the right end is enhanced.

For example, as shown in the waveform diagram shown in FIG. 6, the scanning period $T_{SCAN}$ is divided into a plurality of (eight, for example) equal sections, so that the control voltage $V_{CNT}$, that is, the luminance of the LED 128 may be configured so as to be switched for each of the sections. The control voltage $V_{CNT}$ may be caused to change moderately at boundaries between the adjacent sections.

In this way, although the vehicle lamp 1 according to this embodiment can preferably be used in the blade scanning headlamp, the vehicle lamp 1 can also be made use of for other types of headlamps.

Thus, the present invention has been described based on the embodiment. This embodiment only illustrates the example of the present invention, and hence, it should be obvious to those skilled in the art to which the present invention pertains that the embodiment can be modified variously by combining the constituent elements and the treating processes described in the embodiment and that the resulting modified examples should fall in the scope of the present invention. Hereinafter, such modified examples will be described.

First Modified Example

Figure 10A:
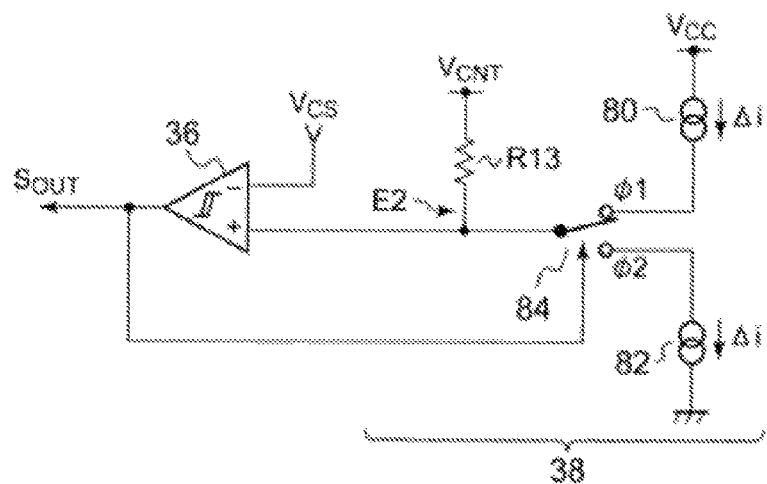
FIGS. 10A and 10B are circuit diagrams of threshold voltage generating circuits according to modified examples.
Figure 10B:
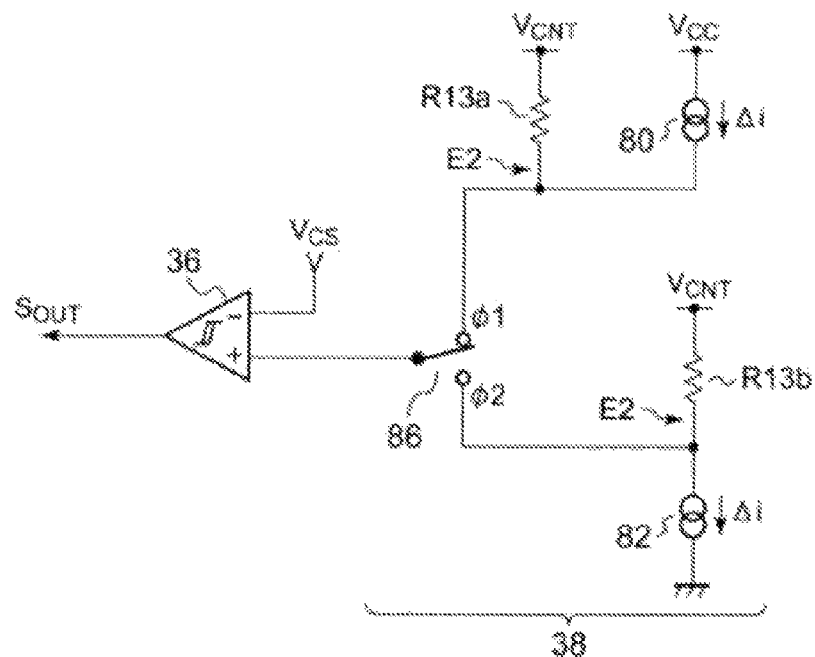

FIGS. 10A and 10B are circuit diagrams of threshold voltage generating circuits 38 according to a modified example. The threshold voltage generating circuits 38 include a thirteenth resistor R13, a first current supply 80, and a second current supply 82. A first end of the thirteenth resistor R13 is connected to a control line 52 to which a control voltage $V_{CNT}$ is given. The first current supply 80 sources a supply of an amount of constant current Δi according to a target value of a potential difference ΔV to a second end E2 of the thirteenth resistor R13. The second current supply 82 sinks the constant current Δi from the second end E2 of the thirteenth resistor R13. The threshold voltage generating circuits 38 are configured so as to switch states between (i) a first state φ1 in which the first current supply 80 is connected to the second end E2 of the thirteenth resistor R13 to thereby generate an upper threshold voltage $V_{THH}$ in the second end E2 and (ii) a second state φ2 in which the second current supply 82 is connected to the second end E2 of the thirteenth resistor R13 to thereby generate a lower threshold voltage $V_{THL}$ in the second end E2. In FIG. 10A, a selector 84 is provided to switch the states between the first state φ1 and the second state φ2. In FIG. 10B, thirteenth resistors 13a, 13b are provided individually for the first current supply 80 and the second current supply 82, and voltages at second ends E2 of the two thirteenth resistor R13a, R13b can be selected by a selector 86.

According to the threshold voltage generating circuits 38 shown in FIGS. 10A and 10B, $V_{THH}=V_{CNT}+R13\times\Delta i$ can be generated in the first state φ1, and $V_{THL}=V_{CNT}-R13\times\Delta i$ can be generated in the second state φ2. Δi may be changed according to the input voltage $V_{IN}$ and the output voltage $V_{OUT}$ in order to suppress the change in frequency when the voltage changes.

Second Modified Example

As the semiconductor light source 10, in addition to the LED, a semiconductor light source such as an LD (laser diode) or an organic EL (electroluminescence) may be used.

Third Modified Example

While the switching converter 30 is made up of the Cuk converter in the embodiment described above, the present invention is not limited thereto. For example, the switching converter 30 is the step-down type converter (the Buck converter), and the step-down converter may be controlled by the use of a converter controller 32. As this occurs, a flyback or forward type pre-boosting and step-down converter may be inserted in a previous stage to the step-down converter to receive a battery voltage $V_{BAT}$.

While the present invention has been described by the use of the specific words and phrases based on the embodiment, the embodiment only illustrates the principle and application of the present invention, and therefore, many modifications or changes in arrangement are allowed to be made to the embodiment without departing from the idea of the present invention prescribed in claims, which will be described below.

The invention claimed is:

1. A lighting circuit for using together with a semiconductor light source and making up a vehicle lamp, comprising:
   a switching converter which supplies power to the semiconductor light source; and
   a converter controller which controls the switching converter, wherein the converter controller comprises:
   a current detection circuit configured to detect a current which is supplied from the switching converter to the semiconductor light source;
   a hysteresis comparator configured to compare a detected current value with an upper threshold voltage and lower threshold voltage to generate a control pulse according to the result of the comparison;
   a driver configured to switch a switching element of the switching converter according to the control pulse; and
   a threshold voltage generating circuit configured to receive a variable control voltage which indicates a target current amount to generate an upper threshold voltage and a lower threshold voltage according to the control voltage received.

2. The lighting circuit according to claim 1, wherein the switching converter includes a Cuk converter.

3. A vehicle lamp comprising:
   a semiconductor light source including a plurality of light emitting devices which are connected in series;
   the lighting circuit according to claim 1 which is configured to light the semiconductor light source; and
   a blade which is disposed so as to receive light emitted from the semiconductor light source to shine reflected light on to the front of the vehicle and which repeats a predetermined periodical motion.

4. The vehicle lamp according to claim 3, wherein the control voltage which is given to the lighting circuit changes periodically in synchronism with the periodical motion.

5. The vehicle lamp according to claim 1, wherein the threshold voltage generating circuit outputs one of the upper threshold voltage and the lower threshold voltage to the hysteresis comparator according to the control pulse.

6. A lighting circuit for using together with a semiconductor light source and making up a vehicle lamp, comprising:
   a switching converter which supplies power to the semiconductor light source; and
   a converter controller which controls the switching converter, wherein the converter controller comprises:
   a current detection circuit configured to detect a current which is supplied from the switching converter to the semiconductor light source;
   a hysteresis comparator configured to compare a detected current value with an upper threshold voltage and lower threshold voltage to generate a control pulse according to the result of the comparison;
   a driver configured to switch a switching element of the switching converter according to the control pulse; and
   a threshold voltage generating circuit configured to receive a variable control voltage which indicates a target current amount to generate an upper threshold voltage and a lower threshold voltage according to the control voltage received,
   wherein the threshold voltage generating circuit maintains constant a potential difference between the upper threshold voltage and the lower threshold voltage irrespective of the magnitude of the control voltage.

7. The lighting circuit according to claim 6, wherein the control voltage changes down as a lower voltage limit where the lower threshold voltage becomes 0V.

8. The lighting circuit according to claim 6, wherein the threshold voltage generating circuit comprises:
   a first resistor and a second resistor which have equal resistance values and which are provided in series between a control line to which the control voltage is given and a ground line to which a ground voltage is given;

a third resistor of which a first end is connected to an output node which is a connecting point of the first resistor and the second resistor; and a voltage supply configured to generate a first voltage which is lower by a differential voltage Which corresponds to a target value of the potential difference than the control voltage and a second voltage which is higher by the differential voltage than a ground voltage, wherein (i) a first state in which the first voltage is applied to a second end of the third resistor to thereby generate the upper threshold voltage in the output node and (ii) a second state in which the second voltage is applied to the second end of the third resistor to thereby generate the lower threshold voltage in the output node can be switched according to the control pulse.

9. The lighting circuit according to claim 6, wherein the threshold voltage generating circuit is configured so as to adjust a target value of the potential difference according to an input voltage and an output voltage of the switching converter.

10. The lighting circuit according to claim 8, wherein the voltage supply includes:

a first output terminal configured to generate the first voltage;

a second output terminal configured to generate the second voltage;

a fourth resistor which is provided between the control line and the first output terminal;

a fifth resistor which is provided between the second output terminal and the ground line; and a current supply which is provided between the first output terminal and the second output terminal to generate a control current which is adjusted according to the control voltage and the input voltage and the output voltage of the switching converter.

11. The lighting circuit according to claim 8, wherein the voltage supply includes:

a first output terminal configured to generate the first voltage;

a second output terminal configured to generate the second voltage;

a fourth resistor which is provided between the control line and the first output terminal;

a fifth resistor which is provided between the second output terminal and the ground line;

a first transistor which is provided between the first output terminal and the second output terminal;

an error amplifier having a first input and a second input;

a sixth resistor which is provided between a control terminal of the first transistor and an output of the error amplifier;

a seventh resistor which is provided between a power supply line to which a power supply voltage is given and the output of the error amplifier;

an eighth resistor which is provided the first input of the error amplifier and the second output terminal;

a ninth resistor which is provided between an input line to which an input voltage is given and the first input of the error amplifier;

a tenth resistor which is provided between the control line and the second input of the error amplifier;

an eleventh resistor which is provided an output line to which an output voltage of the switching converter is given and the second input of the error amplifier; and a twelfth resistor which is provided between the second input of the error amplifier and the ground line.

12. The lighting circuit according to claim 6, wherein the threshold voltage generating circuit comprises:

a thirteenth resistor of which one end is connected to a control line to which the control voltage is given;

a first current supply which sources a supply of an amount of constant current according to a target value of the potential difference to a second end of the thirteenth resistor; and a second current supply which sinks the constant current from the second end of the thirteenth resistor, wherein (i) a first state in which the first current supply is connected to the second end of the thirteenth resistor to thereby generate the upper threshold voltage in the second end and (ii) a second state in which the second current supply is connected to the second end of the thirteenth resistor to thereby generate the lower threshold voltage in the second end can be switched.

13. The lighting circuit according to claim 6, wherein the switching converter includes a Cuk converter.

14. A vehicle lamp comprising:

a semiconductor light source including a plurality of light emitting devices which are connected in series;

the lighting circuit according to claim 6 which is configured to light the semiconductor light source; and a blade which is disposed so as to receive light emitted from the semiconductor light source to shine reflected light on to the front of the vehicle and which repeats a predetermined periodical motion.

15. The vehicle lamp according to claim 14, wherein the control voltage which is given to the lighting circuit changes periodically in synchronism with the periodical motion.

* * * * *